(12) United States Patent
Hazen et al.

(10) Patent No.: US 9,311,806 B2
(45) Date of Patent: Apr. 12, 2016

(54) DEVICE AND METHOD FOR MONITORING FLUID CONSUMPTION

(71) Applicants: Tyrone H. Hazen, Bend, OR (US); Wallis E. Levin, Bend, OR (US)

(72) Inventors: Tyrone H. Hazen, Bend, OR (US); Wallis E. Levin, Bend, OR (US)

(*) Notice: Subject to any disclaimer, the term of this patent is extended or adjusted under 35 U.S.C. 154(b) by 0 days.

(21) Appl. No.: 14/288,479

(22) Filed: May 28, 2014

(65) Prior Publication Data

US 2014/0354438 A1 Dec. 4, 2014

Related U.S. Application Data

(60) Provisional application No. 61/829,533, filed on May 31, 2013.

(51) Int. Cl.

| G08B 21/00 | (2006.01) |
|---|---|
| G08B 21/18 | (2006.01) |
| G08B 21/04 | (2006.01) |
| A47G 19/22 | (2006.01) |
| A47G 23/10 | (2006.01) |
| G01F 23/00 | (2006.01) |

(52) U.S. Cl.
CPC .......... *G08B 21/182* (2013.01); *A47G 19/2205* (2013.01); *A47G 19/2255* (2013.01); *A47G 19/2266* (2013.01); *A47G 23/10* (2013.01); *G01F 23/0076* (2013.01); *G08B 21/0423* (2013.01)

(58) Field of Classification Search
CPC .............. G08B 21/0423; A47G 23/10; A47G 19/2205; A47G 19/2255; A47G 19/2266
USPC .......................................................... 340/618
See application file for complete search history.

(56) References Cited

U.S. PATENT DOCUMENTS

| 5,170,380 A * | 12/1992 | Howard ................ A61J 7/0472 221/15 |
|---|---|---|
| 2002/0130133 A1* | 9/2002 | Immerman ........ A47G 19/2255 220/630 |
| 2004/0177642 A1* | 9/2004 | Citrynell ............ A47G 19/2255 62/457.3 |
| 2005/0224448 A1* | 10/2005 | Sutton ................ A47G 19/2227 215/386 |
| 2007/0222619 A1* | 9/2007 | Moran ....................... 340/573.1 |
| 2010/0182518 A1* | 7/2010 | Kirmse et al. ................ 348/836 |
| 2011/0098965 A1* | 4/2011 | Chan et al. ..................... 702/130 |
| 2011/0149693 A1* | 6/2011 | Liao ................................ 368/10 |
| 2011/0155750 A1* | 6/2011 | Bernstein .................. A45F 3/16 220/714 |
| 2011/0180564 A1* | 7/2011 | Jones ....................... A47K 5/12 222/1 |
| 2013/0103463 A1* | 4/2013 | Briar et al. ................... 705/14.4 |
| 2013/0118639 A1* | 5/2013 | Springer ................. B67C 3/264 141/2 |
| 2013/0203024 A1* | 8/2013 | Dekar .................... B25J 11/008 434/127 |
| 2013/0213960 A1* | 8/2013 | Cook .................. A47G 19/2205 220/23.87 |
| 2013/0228544 A1* | 9/2013 | Benetti ............. A47G 19/2255 215/378 |
| 2013/0240545 A1* | 9/2013 | O'Sullivan ......... A47G 19/2266 220/710 |
| 2013/0319915 A1* | 12/2013 | Gellibolian et al. ............ 210/87 |

(Continued)

*Primary Examiner* — Quang D Pham

(57) ABSTRACT

A device and method for monitoring the removal or consumption of fluid from a container. The device has a housing with an attachment means on one side for affixing the device to a fluid container and a plurality of electrical components environmentally protected within the housing. The electrical components include a display screen having a length about the height of the container, a keypad, a timer and a processor. All of the electrical components are powered by and connected to a power source. The processor contains computer instructions that when activated indicate on the display screen the level of fluid that should have been removed or consumed based on the time since activation. This provides the user with information for monitoring fluid consumption.

10 Claims, 1 Drawing Sheet

(56) References Cited

U.S. PATENT DOCUMENTS

| | | | |
|---|---|---|---|
| 2014/0046596 A1* | 2/2014 | Chang et al. | 702/3 |
| 2014/0124470 A1* | 5/2014 | Alberts | A47G 19/2205 215/12.1 |
| 2014/0186507 A1* | 7/2014 | Wales | A47J 43/27 426/519 |
| 2014/0240122 A1* | 8/2014 | Roberts | G08B 21/182 340/539.11 |
| 2014/0300273 A1* | 10/2014 | LeBrun | G09F 23/06 315/76 |
| 2014/0303790 A1* | 10/2014 | Huang | G06Q 50/22 700/281 |
| 2014/0332495 A1* | 11/2014 | Choi | A47G 19/2255 215/378 |
| 2014/0340229 A1* | 11/2014 | Wu | G08B 21/24 340/603 |
| 2015/0090711 A1* | 4/2015 | Peterson | A47G 19/2272 220/4.07 |

* cited by examiner

DEVICE AND METHOD FOR MONITORING FLUID CONSUMPTION

CROSS-REFERENCE TO RELATED APPLICATIONS

This application claims priority from provisional patent application Ser. No. 61/829,533 filed 31 May 2013.

STATEMENT REGARDING FEDERALLY SPONSORED RESEARCH OR DEVELOPMENT

None

INCORPORATION-BY-REFERENCE OF MATERIAL SUBMITTED ON COMPACT DISC

None

BACKGROUND OF THE INVENTION (1) Field of the Invention

This invention is directed to devices and methods for providing fluid intake information to a user for the purpose of maintaining sufficient or proper hydration. More particularly, the invention is a device that can be affixed to, or integrated into, a fluid container that indicates the amount of fluid that should be, or should have been, consumed over a period of time for a specified fluid volume.

(2) Description of Related Art

Water is one of the body's principal chemical components comprising about 60 percent of an individuals body weight. Every system in the body relies on water for a variety of purposes. For example, water flushes toxins from vital organs, carries nutrients to cells, prevents constipation and provides a moist environment for ear, nose and throat tissues. Water loss occurs naturally through breathing, perspiration and in waste.

The Institute of Medicine recommends that the average daily intake of water required for men is about 3 liters and about 2.2 liters for women. Of this amount, approximately 22% of water consumed in the United States comes from food.

When the body fluid is not replaced dehydration can result with an accompanying disruption of metabolic processes. Three types of dehydration have been reported based on serum sodium levels: hypotonic or hyponatremic (referring to a loss of electrolytes, such as sodium), hypertonic or hypernatremic (referring to a loss of water in general), and isotonic or isonatremic (referring to an equal loss of water and electrolytes). Symptoms may include headaches similar to what is experienced during a hangover, decreased blood pressure (hypotension), and dizziness or fainting when standing (orthostatic hypotension). Left untreated, dehydration generally results in delirium, unconsciousness, swelling of the tongue and, in extreme cases, death.

Dehydration is best avoided by consuming water on a regular basis throughout the day. Since the body cannot tolerate large deficits or excesses in total body water, consumption of water must be roughly concurrent with loss. For routine activities in which perspiration is minimal, drinking when thirsty is sufficient to maintain hydration. However, there are a number of factors to consider that can modify the amount of water consumed to maintain proper hydration. These include environmental conditions, activity level and the health of the individual. For example, hot and/or humid weather can increase perspiration requiring an additional fluid intake. An illness resulting in fever, vomiting or diarrhea can cause water loss and women who are expecting or breast-feeding need additional fluids for milk production.

Regular exercise also reduces body fluids. However, relying on thirst alone during exercise may be insufficient to prevent dehydration from occurring. The amount of additional fluid a body requires depends on the amount of perspiration, duration and type of exercise. An extra 400 to 600 milliliters (about 1.5 to 2.5 cups) of water should suffice for short bouts of exercise. During longer intense exercise, water may be insufficient and consuming a drink containing electrolytes will reduce the chances of developing hyponatremia.

Other conditions such as heart failure and some types of kidney, liver and adrenal diseases may impair excretion of water and require limitations on fluid intake.

The need to regulate and/or monitor fluid intake is critical for proper health. Because of this, there are a number of devices that assist individuals in monitoring their fluid intake. U.S. Pat. No. 8,378,830 to Moran discloses a system comprising a cap assembly that can be affixed to a fluid dispenser. The assembly comprises a flow unit for dispensing fluid, sensor for measuring the amount of fluid dispensed and processor for comparing the measured dispensed fluid with the target consumption value. In practice the processing unit measures an actual fluid consumption of the user and compares this value to the target fluid consumption over a particular period of time. The processing unit then alerts the user to increase the actual fluid consumption if the comparison indicates that the actual fluid consumption is less than the target volume in that period. The disadvantage of this type of system is that the flow unit for dispensing the fluid and the sensor are difficult to clean after use. In addition, it may be difficult for the user to stop and consume the volume required if involved in a particular exercise routine. Consequently, the audible alerting feature can be an unwanted distraction. Further, the complexity of the functional aspects of the device may make it more difficult to operate.

U.S. Pat. No. 6,212,959 to Perkins discloses a device comprising a portable liquid reservoir, a liquid consumption meter and a means for transferring the liquid in the reservoir through the meter for monitoring fluid intake. Unfortunately, this device suffers from the same disadvantage as the Moran device. The meter and monitoring element of the meter are difficult to clean and/or sanitize after use.

Two other devices disclosed on the Internet called the Jomi Band and the Jomi Sleeve assist the user in monitoring fluid intake. The Jomi Band comprises a fluid container, an accelerometer and a multipoint control unit (MCU). Presumably the fluid passes through the accelerometer which provides information to the MCU. The MCU calculates the amount of fluid dispensed and compares that to the amount of fluid that should have been consumed and alerts the user if the amount dispensed is less than the target consumption volume. The Jomi Sleeve attaches to the base of a fluid container and determines the amount of fluid dispensed based on the weight of the bottle. This information is then sent via Bluetooth™ to a mobile/tablet application so that the information can be provided in a variety of useful forms such as graphs or charts. Unfortunately, both the Jomi Band and Jomi Sleeve suffer from similar disadvantages as those identified in the patents to Moran and Perkins. The Jomi Band comprises an accelerometer that would be difficult to clean and/or sanitize after uses and the Jomi Sleeve, requires that the bottle be positioned on a flat surface in an upright position to provide accurate readings. This poses a number of problems if the user is a runner, requiring that the user stop and place the bottle on the ground to obtain an accurate reading before continuing the exercise routine.

Consequently, there is a need in the industry for a device that can provide valuable information to the user and is simple to use. More specifically, a device that does not require a substantial input of information into the processing unit, can be easily cleaned and/or sanitized and provides a easy-to-read monitor indicating the amount of fluid that should have been consumed.

BRIEF SUMMARY OF THE INVENTION

The following is a simplified summary that presents a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

One aspect of the present invention is a device for monitoring the removal or consumption of a fluid from a container by a user. The device comprises a housing having an attachment means for affixing the device to a fluid container and a plurality of electrical components environmentally protected within the housing. The electrical components include a display screen having a height about the height of the fluid container, keypad, timer, and processor powered by a power source connected to the display screen, keypad and timer. The processor contains computer instructions that when activated indicate on the display screen a level of fluid that should have been removed or consumed based on the time since activation. The display screen may also provide other desired information, such as for example, the time of day, the volume of fluid and/or the program selected.

Another aspect of the present invention is the device for monitoring the removal or consumption of fluid from a container described above further comprising a container. In one embodiment, the device is affixed to the exterior of the container. In another embodiment, the container is a double walled container and the device is housed within the space between the walls of the container.

In another aspect of the invention, the container has a single or double walled construction and a removable base cap. In the single walled construction the display screen is sealed in a protective encasement and affixed to the exterior of the container having electrical adapters exposed on the container base. In the double walled construction the display screen is sealed within the space between the double walls having electrical adapters exposed on the container base. The plurality of electrical components are environmentally protected within the removable base cap that has electrical connectors to interface with the electrical adapters of the display screen when the base cap is secured to the container base.

In other embodiments of each of these aspects, the invention may further comprise a volume/level sensor, a sound generator and/or a remote control. The volume/level sensor provides information on the level of fluid that has been or should have been consumed. A variety of volume/level sensors may be utilized including for example ultrasonic distance sensor "PING" (Parallax, Rocklin, Calif., item 28015) and Ultrasonic ranging module HC-SR04 (Satistronics, Shenzhen, China). An alert system provides an indication when the amount of fluid removed or consumed has not reached the target consumption level. A variety of alerting means may be utilized and include for example a visible or lighted signal, a tactile or vibration signal or an audible signal. A number of systems known to those skilled in the art that generates an alert may be utilized. In addition, a variety of remote control systems can be utilized such as a Bluetooth™, Wifi, IrDA and HomeRF.

Another aspect of the present invention is a method of monitoring fluid consumption comprising the steps of filing and drinking fluid from a device described above or a container on which a device above is affixed.

DETAILED DESCRIPTION

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

Figure 1:
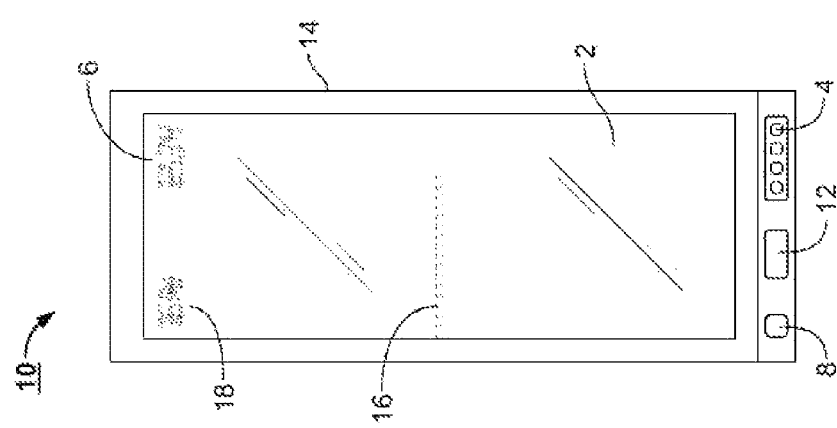
FIG. 1 is a perspective view of one aspect of the invention wherein the device comprises a housing having an attachment means for affixing the device to a fluid container and a plurality of electrical components environmentally protected within the housing.

The exemplary device described herein enables an individual to monitor fluid intake. The device may be prepared in a variety of configurations. One configuration comprises a flexible laminar encasement that houses and protects the electrical components from the environment (FIG. 1). This encasement is provided with a means for effectively affixing the device to an existing fluid container. The processor contains computer instructions that when activated indicate on the display screen a level of fluid that should have been removed or consumed based on the time since activation thereby providing monitoring information to the user.

Figure 2:
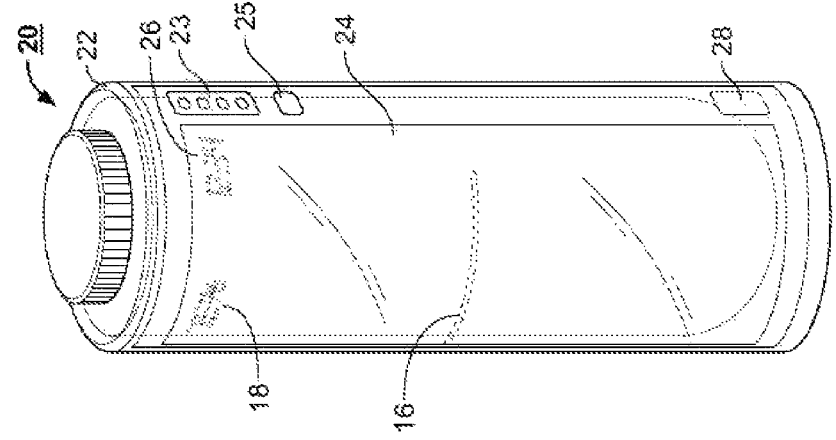
FIG. 2 is a perspective view of another aspect of the invention wherein the device is a double walled container wherein the electrical components are housed within the space between the walls of the container.

In an alternative configuration, a portion of the electric components may be provided on a single flexible sheet that may be inserted and sealed within the walls of a double walled fluid container (FIG. 2). The keypad and power source may be accessible from the exterior of the fluid container allowing the user to input information into the processor and remove and replace the power source.

Figure 3:
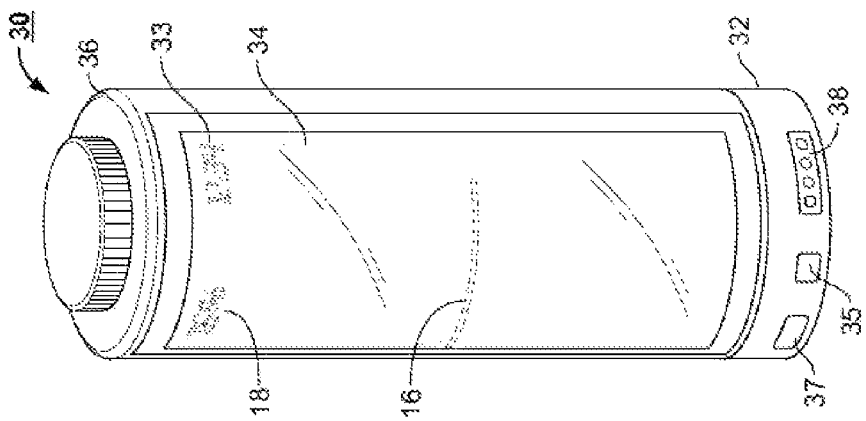
FIG. 3 is a perspective view of yet another aspect of the invention wherein the device is a double walled container with a removable base cap. The display screen is housed within the space between said double walls with electrical adapters exposed on the base. The plurality of electrical components are environmentally protected within the removable base cap that has electrical connectors to interface with the electrical adapters of the display screen when the base cap is in place.

In another configuration, the display screen panel is inserted and sealed within the space between the double walls having electrical adapters exposed on the base of the fluid container (FIG. 3). The remaining electrical components are housed and protected from the environment in a removable base cap on the fluid container having electrical connectors that interface with the electrical adapters of the display screen.

In the flexible laminar configuration (FIG. 1), the electronic display screen 2, keypad 4, and timer are operably connected to the power source 8 and the processor 12, powered by the power source 8, is operably connected to the electronic display screen 2, keypad 4 and timer. These components are arranged in a desired orientation and sealed within the polymer encasement 14 protecting the components from the environment. The encasement 14 may be provided in a variety of colors and is preferably translucent on the visual side of the display screen 2 and may be any color, translucent or opaque on the backside of the display screen 2. The encasement 14 may be vacuum-sealed or may be coated with a flexible nonconductive polymer sealing the components to and within the encasement 14. In a preferred embodiment, the electronic display screen 2 has a length about the maximum height of the fluid that can be stored within the container. Because the height and width of fluid containers vary, the flexible configuration of the present invention will be provided in a variety of heights for each specific volume normally used for fluid containers. The display screen 2 provides visual feedback to the user and manual input/control is provided via key board/buttons 4. A variety of display screens 2 may be utilized with the present invention including for example a flexible display by Plastic Logic LTD (Cambridge, United Kingdom) or Custom Flexible Display by E Ink Corporation (Cambridge, Mass.).

The processor or micro-controller 12 contains code/instructions for bootstrapping the device subsystems and control/receipt of data from the user. A variety of processors may be utilized with the present invention including for example, PIC16F877A (Microchip Technology, Inc. Chandler, Ariz. or Waveshare Electronics, Shenzhen, China) or an 8051 microcontroller (Atmel, San Jose, Calif, or Mouser Electronics, Mansfield Tex.). The timer may be a separate component or may be incorporated or programmed into the processor 2. If the timer is not programmed into the microprocessor, a timer such as for example, MCP7940N (Microchip Technology, Chandler Ariz.) or S-35390A (Seiko Instruments, Chiba Chiba Japan) may be utilized.

The keypad 4 is prepared with pressure sensitive keys that may be easily operated or activated when pressure is applied to the key locations within the polymer encasement. The power source 8 may be replaceable or single use. If the power source 8 is replaceable a thin housing may be provided for retaining the power supply. For example, a pressure set slot may be provided for removing and replacing a wafer battery similar to those used in hearing aids and watches. The pressure set slot provides contacts on the top and bottom sides and a thickness that applies sufficient pressure to hold the battery in place.

In the fluid container 22 configuration (FIG. 2), the display screen 24, timer 26 and processor 28 are sealed within the chamber formed by the double walled construction. The keypad 23 and power supply 25 housing are mounted to and accessible from the exterior of the fluid container 20. The keypad 23 may be provided with pressure sensitive or temperature sensitive elements so that pressure or heat from a fingertip will operate or activate the key. Correspondingly, the housing for the power supply 25 will have an access that allows the power supply 25 to be removed and replaced as needed. In this configuration, the display screen 24, timer and processor 28 may be operably connected on a flexible polymer sheet. This sheet may have additional connectors that operably connect these components to the keypad 23 and power source 25 housing affixed to the exterior wall of the fluid container 20. This connector may be a plug or slot connector for ease of assembly. If the keypad 23 contains pressure sensitive keys, the keypad may be accessible on the exterior of the fluid container 20. Correspondingly, if the keys are temperature sensitive they may be affixed on the interior side of the exterior wall such that the heat of the fingertip at the key location will activate the key. The timer may be a separate component or may be incorporated or programmed into the processor 28 and displayed 26 on the display screen 24.

In another configuration, the fluid container 30 is provided in a double walled construction having a removable base cap 32 (FIG. 3). The display screen 34 is secured and sealed within the space provided in the double walled construction having electronic adapters, one for the electrical input and one for the electrical output of the display screen. Both adapters are exposed on the based of the fluid-containing portion of the container 36. The remaining electronic components including the keypad 38, timer, power source 35 and processor 37 are housed within the removable base cap 32 having exposed electrical connectors. These electrical connectors interface with the electrical adapters of the display screen 34 when the cap 32 is secured on the base of the fluid container 36. The base cap 32 may be provided with a housing that allows the power source 35 to be removed and replaced or may be a single use disposable element. In the latter case, a damaged or otherwise non-operational base cap 32 may be removed and replaced with a new base cap.

Other electronic components may be utilized or built into the present invention. An I/O connector enables input/output of signals to, for example, an optional wireless module such as a Bluetooth™ system may be utilized to activate the device from, and/or transmit its data to, a remote source. This system may require a Bluetooth™ slave such as a BT2S Bluetooth™ to Serial Slave (Virtuabotix, Colorado Springs, Colo.) or a Bluetooth™ module BLK-MD-BC05-B (Shenzhen, Boluteck Company Ltd. Shenzhen, China). Sensors that detect the level of the fluid in the container may also be integrated into the system. Preferably the sensors are those that do not have moving parts and provide a relatively flat and easily assessable surface for cleaning. Sensors of this type may include temperature sensors or sonic sensors. Examples of sonic sensors that may be used include for example PING (Parallax, Inc. Rocklin, Calif., Item 28015) or Ultrasonic ranging module HC-SR04 (Satistronics, Shenzhen, China) Other components known to those skilled in the art for a desired purpose may be incorporated into the existing systems. Further, additional programs may be provided in the processor to accommodate those desired purposes as needed.

If a wireless module such as a Bluetooth™ system is utilized, the system may also alert the user to upcoming appointments, incoming text/phone calls/e-mails or weather alerts. One skilled in the art will recognize that providing this information on the display screen of the current invention may be accomplished in a similar way this information is provided on a cellular phone. The configuration of the present invention will be dictated by the electrical components utilized. For example, if the components cannot be provided in a flexible thin layer construction, the configuration of the invention may be more acceptable to that shown in FIG. 2 or 3.

As stated above, various elements described above may be optional, depending on implementation preference. Moreover, some of the elements may be combined into single elements and some of the connections shown between the various elements may be altered. Accordingly, it is understood that one of ordinary skill in the art may modify the list of elements described above to remove and/or include other functional elements, without departing from the spirit and scope of this disclosure.

A variety of programs may be stored within the processor to allow the user to better select the amount of hydration desired based on the anticipated activity. Those skilled in the art can easily calculate this value and input the speed at which the fluid level indicator 16 will migrate. For example, if the user anticipates low activity, one skilled in the art can take the recommended fluid consumption amount and divide this by the number of waking hours in an average day to obtain the number of ounces to be consumed per hour. Then determine the distance required for the fluid level indicator 16 to migrate based the volume for each migration division to achieve the desired ounces consumed per hour. The time segment of an hour was selected for this example. The actual time segment may be any desired unit of time such as minutes. This migration speed can be varied to meet the additional fluid consumption requirements for moderate or heavy activity and determined in a similar set of calculations. These program selections may merely be provided as choice selections 1, 2 or 3 depending on level of activity having increased hydration with increasing number.

Alternatively, the processor may calculate the speed of the migration of the fluid level indicator 16 based on information provided by the user. For example, the processor may be programmed to receive information such as, volume of fluid to be consumed, the period of time associated with a particular activity and the level of the activity. With this information the processor determines the speed of the fluid level indicator 16 needed to achieve consumption of the desired volume of fluid in the period of time given based on activity level. The user then starts the program established by the processor based on the information provided by pressing one of the keys on the keypad. A portion of the display screen may provide additional information for the user. For example, it may provide the time 16, 26 and 33 or the volume 18 that should have been consumed based on the location of the fluid level indicator position at a given time or a percentage of fluid that should have been consumed up to that specific point in time.

Methods of maintaining proper hydration while at home, work or during exercise may be achieved using the device of the present invention. One method includes filling the device with a fluid that is appropriate for the particular event for which proper hydration is desired. For example, the device may be filled with water for maintaining proper hydration at home or work. Alternatively, during long bouts of exercise or short bouts of intense exercise it may be desirable to fill the device with a fluid that contains electrolytes. The user then selects the program appropriate to their activity. As the level indicator migrates toward the base of the fluid container the user can visualize the amount of fluid above the indicator line and consume fluid to maintain the level below that line. By following this method the user may maintain proper hydration.

Each of the configurations of the present invention requires different levels of assembly. The encased laminar device configuration (FIG. 1) is provided with adhesive on one side covered with an appropriate protective easily removable sheet. The user selects the fluid container of interest and determines the volume and height of the container then selects the appropriately sized device for the fluid container. The protective backing on the adhesive is removed and the device is affixed lengthwise to the side of the fluid container.

In the simplest construction of this configuration, the user will use the keypad to enter the time of day into display screen, which is relayed to the processor and the timer is activated to maintain the correct time. A variety of screen designs may be used to indicate the fluid level in the fluid container above which the fluid should have already been consumed. In this construction, the program does not calculate the amount of fluid to be consumed based on data input by the user. Once the program is initiated, the fluid level indicator begins migrating toward the base of the fluid container.

In another construction of this configuration, a set of programs may be provided for the user to select from to achieve the desired fluid consumption. For example, three programs labeled 1, 2 and 3 may be provided with the activity level of the user increasing with increasing number to assure that proper hydration is achieved. In another construction, the user provides information such as the volume of the fluid to be consumed, the time for consuming the fluid and the activity level. The processor uses this information to select the proper migration speed of the fluid level indicator based on the recommended daily intake of water for the particular level of activity. This information may be obtained from the Institute of Medicine or other reputable institution.

When the user notices that there is an amount of fluid above the indicator line he/she is alerted to increase fluid consumption. The amount of fluid to be consumed is the amount that lowers the level in the fluid container to the fluid level line indicator.

In the double walled construction configuration (FIG. 2), the user purchases a fluid container having the display screen, processor and timer, all sealed within the space between the double walls. The keypad and the housing for the power supply are accessible on the exterior of the fluid container. The user removes the packaging and fills the container with a desired fluid. The user then enters the time of day into the processor using the keypad and the timer is activated to maintain the correct time. The user may also use the keypad to enter the amount of fluid deposited in the fluid container to be consumed. The display screen may provide instructions in this regard for ease of use. An instruction may also be provided to press a key on the keypad to initiate the program of monitoring fluid consumption. Once initiated, as in the example above, a visible line running perpendicular to the length of the device appears and migrates towards the base of the fluid container as time progresses indicating the amount of fluid that should have been consumed from the container.

The programming may provide a variety of functions. For example, it may allow the user to halt or terminate the present monitoring program, re-initiate the program, reenter or adjust the volume, increase or decrease the migration of the fluid level indicator and allow for more than one program to be stored and initiated when desired. For example, under short bouts of exercise the fluid level indicator may be programmed to migrate more slowly, while during more intense exercise the fluid level indicator may be programmed to migrate more quickly assuring that the user is appropriately hydrated based on the exercise regimen.

In the removable base cap configuration (FIG. 3), the user purchases a fluid container having a single or double walled construction. In the single walled construction, the display screen is sealed within a flexible encasement that may be affixed to the exterior surface of the fluid container with electronic adapters exposed on the base. In the double walled construction, the display screen is sealed within the space between the double walls with electronic adapters exposed on the base. The removable base cap contains the remaining electronic components with electrical connectors exposed on its surface for making operable contact with the display screens electronic adapters when the base is secured to the bottom of the fluid container. The user removes the packaging and assembles the device by securing the removable base cap to the bottom of the fluid container. The removable base cap may be secured in a variety of methods known to those skilled in the art. Preferably the removable base cap is screwed onto the bottom of the fluid container. The benefit of this construction is that the electronic components of the device may be removed before the fluid container is washed or sanitized. For example, the removable base cap is removed before the fluid container is placed in the dishwasher.

In this configuration the keypad is provided on the removable base cap for entering the information as discussed above, establishing desired programs and initiating a specific program to meet the needs of the user.

One possible exemplary process of operation of the device starts with arming the device. The arming process may include merely pressing one of the keys of the keypad. Next, the amount of fluid dispensed into the fluid container is input into the system. Then the program is initiated by pressing one of the keys of the keypad and fluid consumption indicator line appears on the display screen and begins migration to the base of the fluid container. The user then consumes the fluid to maintain the level of fluid below the indicator line. Once the indicator line reaches the bottom of the display screen the process stops.

Alternatively, if the user intends to consume more than the fluid container can dispense the user may input the total amount of fluid to be consumed and initiate the program. If, for example, the fluid container holds 32 ounces and the user would like to consume 62 ounces he/she will have to refill the fluid container when the first volume is consumed. The fluid consumption indicator line once reaching the base of the display will return to the top and begin its second migration. Once the indicator line reaches the bottom of the display for the second time the process stops. This cycle can be performed multiple times depending on the amount of fluid to be consumed and the volume of the fluid container used.

The information set forth above is provided to give those of ordinary skill in the art a complete disclosure and description of how to make and use the embodiments of the device and methods, and are not intended to limit the scope of what the inventor regards as his invention. Modifications of the above-described modes for carrying out the invention that are obvious to persons of skill in the art are intended to be within the scope of the following claims. All publications, patents, and patent applications cited in this specification are incorporated herein by reference.

What is claimed is:

1. A device for monitoring removal or consumption of a fluid from a container by a user comprising:
   said container for holding fluid, said container having a container base and a removable/replaceable base cap;
   a display screen housed within a flexible encasement affixed to said container, said display screen having electrical adapters exposed on said container base, wherein the display screen extends the height of said container;
   a plurality of electrical components activated upon device activation and environmentally protected within said removable/replaceable base cap, said electrical components comprising:
   a keypad;
   a timer to monitor time when said device is activated;
   a power source to said keypad and said timer; and
   a processor powered by said power source connected to said timer and having electrical connectors that interface with said electrical adapters of said display screen when said removable/replaceable base cap is being affixed on said container base, wherein said processor contains computer instructions that when activated indicate on said display screen a level of said fluid that should have been removed or consumed based on the time since said device activation thereby providing monitoring information to said user.

2. The device according to claim 1, further comprising a volume/level sensor environmentally protected within and attached to said removable/replaceable base cap, wherein said sensor provides level or volume information to said processor.

3. The device according to claim 1, further comprising a sound generator, wherein said sound generator provides an audible alert when said amount of fluid to be removed or consumed has not been removed or consumed from said container by said user.

4. The device according to claim 1, further comprising an electronic component that provides remote control.

5. The device according to claim 4, wherein the electronic component that provides remote control is a Bluetooth ™ transmitter.

6. A method of monitoring fluid consumption from a container by a user, comprising the steps of:
   filing said container with fluid, wherein said container having a container body with a container base and a removable/replaceable base cap;
   a display screen housed within an encasement affixed to said container, said display screen having electrical adapters exposed on said container base, wherein the display screen extends the height of said container;
   a plurality of electrical components activated upon device activation and environmentally protected within and attached to said removable/replaceable base cap, said electrical components comprising:
   a keypad;
   a timer to monitor time when said device is activated;
   a power source to said keypad and said timer; and
   a processor powered by said power source connected to said timer and having electrical connectors that interface with said electrical adapters of said display screen when said removable/replaceable base cap is being affixed on said container base, wherein said processor contains computer instructions that when activated indicate on said display screen a level of said fluid that should have been removed or consumed based on the time since said device activation thereby providing monitoring information to said user; and
   drinking said fluid from said container, wherein said device notifies said user by indicating the level of fluid that should have been consumed thereby providing fluid consumption information to said user.

7. The method according to claim 6, further comprising a volume/level sensor environmentally protected within and attached to said removable/replaceable base cap, wherein said sensor provides level or volume information to said processor.

8. The method according to claim 6, further comprising a sound generator, wherein said sound generator provides an audible alert when said amount of fluid to be removed or consumed has not been removed or consumed from said container by said user.

9. The method according to claim 6, further comprising an electronic component that provides remote control.

10. The method according to claim 9, wherein the electronic component that provides remote control is a Bluetooth™ transmitter.

* * * * *